Figure 1:
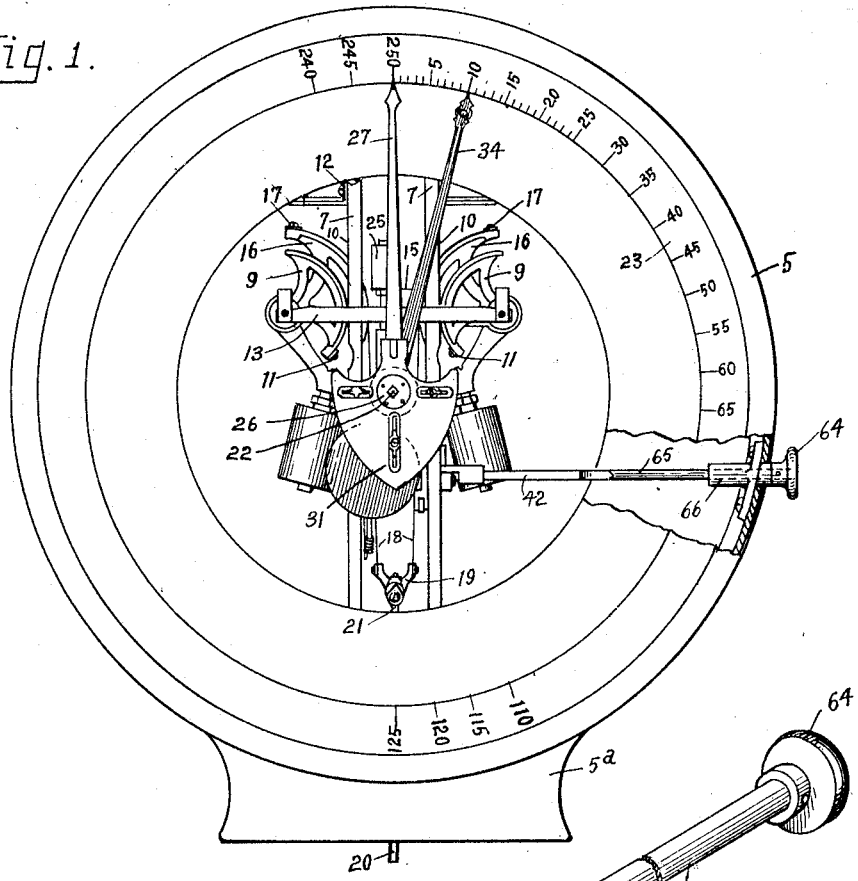

H. O. HEM.
WEIGHING SCALE.
APPLICATION FILED AUG. 14, 1916.

1,278,646.

Patented Sept. 10, 1918.
2 SHEETS—SHEET 1.

INVENTOR.
Halvor O. Hem
by George R. Frye
Attorney

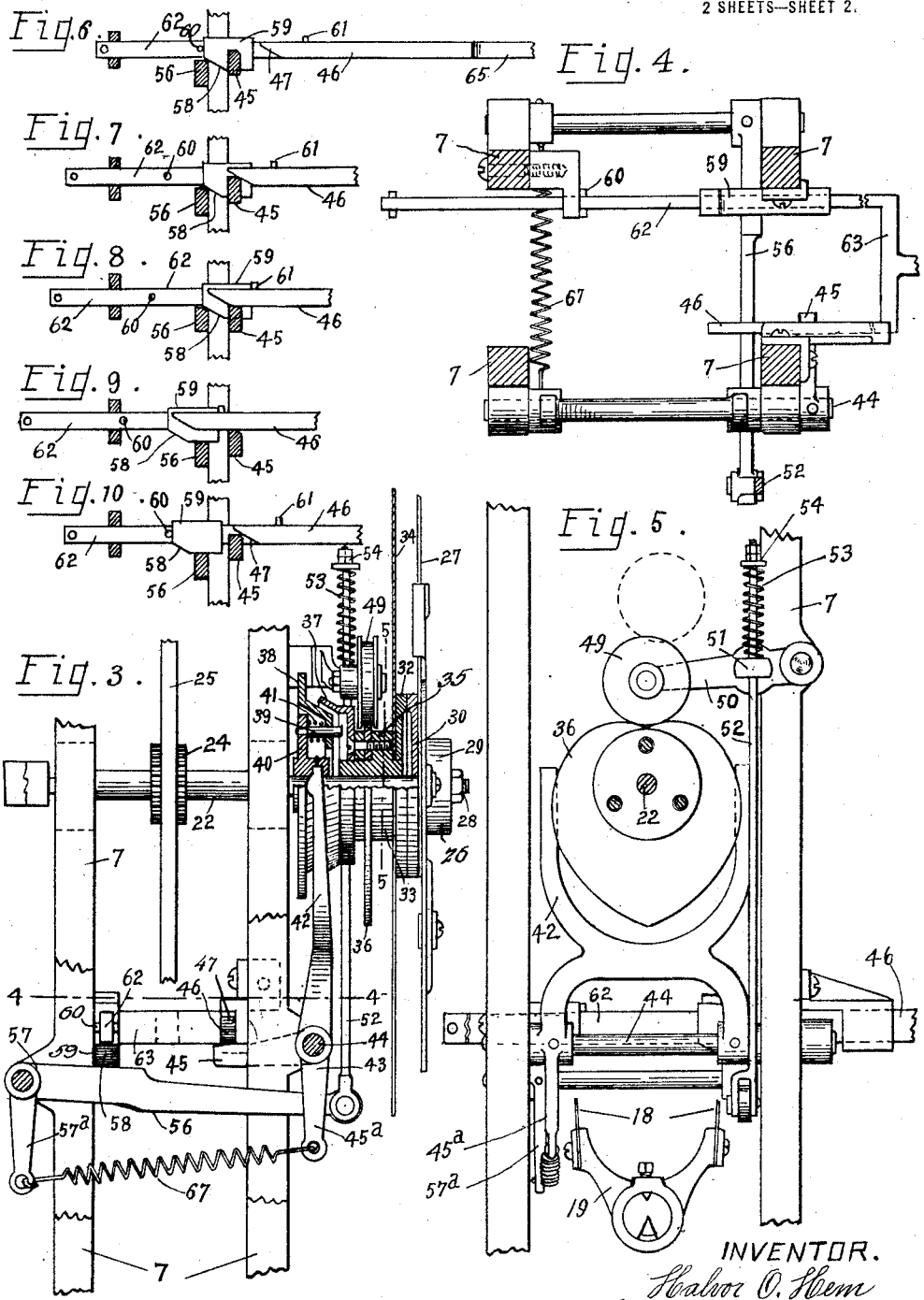

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING-SCALE.

1,278,646. Specification of Letters Patent. Patented Sept. 10, 1918.

Application filed August 14, 1916. Serial No. 114,787.

*To all whom it may concern:*

Be it known that I, HALVOR O. HEM, a citizen of the United States, residing at Toledo, in the county of Lucas and State of Ohio, have invented certain new and useful Improvements in Weighing-Scales, of which the following is a specification.

This invention relates to weighing scales, and has for its primary object the provision of a scale having indicating means arranged to conveniently and accurately indicate the net, gross and tare weights of articles being weighed, so that all of these various weights can be immediately ascertained by the operator.

A further object of this invention is to provide a scale having a plurality of indicator hands positioned and arranged to act together to indicate the weight of articles placed upon the scale platform, one or more of said indicating hands being adjustable relatively to the other or others of said indicator hands, enabling the operator to shift one or more of the indicator hands from any desired position without disturbing the position of the remaining indicator hands.

A further object of the invention is to provide a simple and inexpensive mechanism for automatically locking one of the indicator hands in any adjusted position and return the other indicator hand to exact zero position on the dial, and then to release the locked indicator hand while the adjustable indicator hand is held in this zero position.

With the above and other objects which will more readily appear from the following description, my invention consists of the novel construction, combination and arrangement of parts hereinafter more fully described and particularly pointed out in the subjoined claims.

Reference is to be had to the accompanying drawings illustrating a preferred embodiment of my invention, and wherein similar reference numerals designate similar parts throughout the several views.

In the drawings:—

Figure 2:
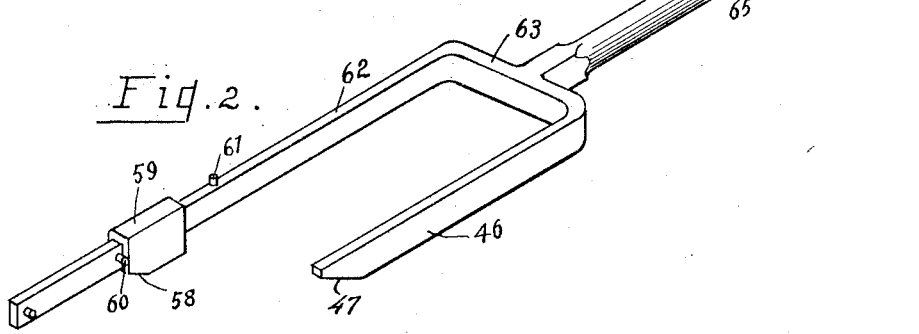

Figure 1 is a front elevation, with parts broken away, of the upper portion of a weighing scale embodying my invention; Fig. 2 is an enlarged perspective view of the slidable cam actuating means; Fig. 3 is a detail side elevation, with parts in section, of the mounting of the dual indicator hands and connected mechanism; Fig. 4 is a detail sectional view taken substantially on the line 4—4 of Fig. 3; Fig. 5 is a detail front elevation, with parts in section, taken substantially on the line 5—5 of Fig. 4; Figs. 6–10 inclusive are detail views of the timed operation of the slidable cam-operating mechanisms.

In the drawings, the numeral 5 designates a scale housing adapted to inclose the weighing mechanism of the scale, having a neck 5ª adapted to be supported upon a suitable column (not shown), the lower end of which is associated with the platform of the scale in the usual manner. The weighing mechanism of the scale in the embodiment herein shown comprises a rectangular frame having four vertical pillars 7 suitably supported from the wall of the scale housing and secured together at top and bottom by cross-pieces (not shown). The pillars 7, as herein shown, form bearings or tracks for rocker segments 9 (Fig. 1) which have rolling contact thereon, being supported in position by flexible ribbons 10 of steel or other suitable material fastened to the lower ends of the segments, as at 11, and at their upper ends to the pillars, as at 12, being thus interposed between the pillars and segments at every position of the latter. The segments 9 are suitably secured in a vertically-movable frame 13, which serves to connect the several segments with each other, and through the medium of the resilient connecting member 15 with the indicating mechanism of the scale. Arranged adjacent the supporting segments 9 are larger segments 16 which are also suitably mounted in the vertically-movable frame 13, said segments extending at their periphery between the pillars 7 at the opposite sides of the rectanglar frame and are connected at their upper ends, as at 17, to metallic ribbons 18 which pass over the arcuate faces of the segments and are attached at their lower ends to an equalizer bar 19, as clearly shown in Fig. 1. The equalizer bar 19 is suitably connected, as by means of a steelyard rod 20 and U-shaped links 21, to the platform levers (not shown) supporting the scale platform. It is to be understood that any suitable platform or platform lever mechanism may be employed in connection with the weighing mechanism of the scale, the weighing mechanism herein shown being designed to operate when employed in various forms of scales.

It is also to be understood that this invention is not necessarily restricted to use with weighing mechanism of the character herein shown, any suitable mechanism arranged to counterbalance a load placed on the scale platform and accurately drive an indicator shaft through a proportionate arc to indicate the weight thereof being capable of use in connection with my invention, various mechanisms well-known in the scale art being fully capable of performing the required functions. The embodiment herein illustrated has, however, been found to successfully demonstrate the capabilities of this invention, and it is therefore illustrated as a preferred form of weighing mechanism.

An indicator shaft 22 is mounted concentrically of the dial 23 and carries a pinion 24 (see Fig. 3) arranged to mesh with a vertically-disposed rack 25 connected by the resilient connecting member 15 to the vertically-movable frame 13. In its forward extremity the indicator shaft 22 is reduced, as shown in Fig. 3, and carries the hub 26 of a fixed indicator hand 27, the hub 26 being secured by a key and lock nut 28 or in any other desired manner. The hub 26 is formed with a circular flange 30 coöperating with the collar 29 in positioning the indicator hand 27, which hand is preferably formed of sheet metal and adjacent its pivotal point is expanded into a plate which is appropriately slotted, as at 31, (Fig. 1), to receive small adjustable weights for accurately counterbalancing the hand.

The flange 30 is adapted to normally contact with a similar flange 32 fixed upon the hub 33 of an adjustable indicator hand 34, the contacting faces of the flanges 30 and 32 aiding in effecting simultaneous rotation of the fixed and adjustable indicator hands from the weighing mechanism. The hub 33 is loosely mounted upon the reduced portion of the indicator shaft 22 so as to be rotatable thereon and is detachably connected with said shaft through the medium of a friction clutch mechanism presently to be described. As herein constructed, the hub 33 is provided with a peripheral flange 35 to which are secured a heart-shaped cam 36 and a cupped friction disk 37, as clearly shown in Fig. 3. The friction disk 37 is adapted to coöperate with the friction disk 38 secured to the shaft 22 through the following mechanism: A plurality of studs 39 extending forwardly from the spider 40 pinned or otherwise secured to the indicator shaft 22 enter apertures formed in the disk 38 to impart rotative motion thereto while coil springs 41 surrounding the studs 39 allow for sliding motion of the disk 38 and normally maintain the clutch disks 37 and 38 in contact. The disk 38 is extended at its periphery beyond the active clutch face to provide a flange for contact with the bifurcated upper arm 42 of the clutch-throwing lever 43, which is pivoted on the shaft 44 journaled in brackets on the pillars 7, and provided with a laterally-extending arm 45 adapted to be engaged by the clutch-throwing cam-rod 46 to trip the lever. As herein shown, the arm 45 is arranged in the path of movement of the slidable rod 46 which has an inclined surface 47 at its inner end which engages the upper face of the arm 45 and forces it downwardly, this downwardly-extended position being maintained by the upper face of the arm 45 engaging the lower surface of the slidable rod 46. When the clutch-throwing lever 43 is tripped by the downward pressing of the arm 45, the contact faces of the bifurcated arms 42 will engage the disk 38 on the opposite side of the center, serving to first stop rotative movement of the disk, and then when further pressure is applied to the lever to move the disk 38 out of engagement with the companion friction disk 37. This sliding movement of the disk 38 is made against the pressure of the coil springs 41 and the combined pressures exerted by the springs 41 and lever 43 provide an effective locking engagement of the disk and lever so as to securely hold the disk 38 and the indicator shaft connected thereto against rotative movement, thus locking the fixed indicator hand 27 in any adjusted position whenever desired.

The means for independently rotating the adjustable indicator hand 34 while the indicator hand 27 is so locked will now be described. The peripheral edge of the heart-shaped cam 36 is adapted to be contacted by a grooved roller 49 pivotally mounted at the free end of an arm 50, the other end of which is pivoted on the framework of the scale (see Fig. 5). An apertured bracket 51 is pivotally connected with the arm 50 intermediate its ends, the upper end of the vertically-disposed rod 52 extending through the aperture thereof and being maintained in spaced relation therefrom by the coil spring 53 arranged between the upper side of the bracket and an adjustable collar 54 on the rod. At its lower extremity the rod 52 is pivotally connected with the horizontally-disposed arm 56 of a bell-crank lever 57, which is adapted to be engaged by the inclined face 58 of a slidable cam 59 loosely mounted between stops 60 and 61 on the slidable rod 62, which rod is preferably connected, as by the cross-bar 63, with the slidable rod 46 above described in connection with the clutch-throwing mechanism. The crossbar 63 is connected with a knob 64 outside the housing 5 of the scale by means of a bar 65 extending through an elongated bearing 66 on the scale housings, (see Figs. 1 and 2).

The heart-shaped cam 36 is so positioned and secured to the hub of the adjustable indicator hand 34 that the center point of the recess therein is adapted to be in engagement with the roller 49 when the adjustable indicator hand 34 points to zero on the dial 23. From this center point the heart-shaped cam extends equally on both sides to an apex diametrically opposite this recess, the curvature being such that the heart-shaped cam and the elements attached thereto will be rotated when the roller 49 is forcibly thrown into engagement with the edge of the cam. The rocking of the lever 56 when engaged by the cam 59 pulls the rod 52 downwardly and forces the roller 49 into engagement with the periphery of the heart-shaped cam, the spring 53 serving to maintain the engagement as long as the rod 52 is depressed. The pressure exerted rotates the heart-shaped cam and connected elements until the roller centers itself in the recess of the cam.

The normal position of the slidable rods 46 and 62 and the slidable cam 59 on the rod 62 is best shown in Fig. 6, and when the knob 64 is grasped and pushed inwardly, the rod 62 moves within the cam 59 until the rear face of said cam is engaged by the stop 61, the inclined face 47 of the rod 46 having meanwhile been brought into engagement with the lever arm 45 (see Fig. 7) of the clutch-throwing mechanism so that the clutch-throwing mechanism is actuated before the heart-cam actuating mechanism is engaged. Further movement of the rod 62 forces the cam 59 into engagement with the lever arm 56 (see Fig. 8), rocking said arm downwardly as it slides along the inclined surface 58, this downwardly-extended position of the arm being maintained by the engagement of the flat underside of the cam 59 with the upper face of the lever 56 (see Fig. 9). Also when, after the completion of the operations of the clutch-throwing mechanism and the heart-cam actuating mechanism, the knob 64 is grasped and pulled outwardly to return the rods 46 and 62 to their normal position, the rod 62 moves within the cam 59 until the stop 60 is brought into engagement with the front face of the cam 59, as shown in Fig. 10, the rod 46 having meanwhile been moved entirely out of engagement with the lever arm 46 (Fig. 10) so that the clutch-throwing mechanism is released prior to the release of the heart-cam actuating mechanism, so that the roller 49 will hold the heart-cam 36 and attached mechanism to maintain the adjustable indicator hand 34 in exact zero position until after the clutch-throwing mechanism has been released to its normal position. Further movement of the rod 62 then moves the cam 59 to its normal position, as shown in Fig. 6. A light spring 67 joins an arm 57ª extending from the lever arm 56 and an arm 45ª extending from the lever arm 45 so as to maintain the arms 45 and 56 in their normal raised position.

In the operation of the scale, when it is desired to utilize the scale as a net, gross and tare weight indicator, the container, such as a box or vessel, is first placed upon the scale platform, and the weighing mechanism will be actuated thereby to rotate the indicator shaft 22 and both indicator hands 27 and 34 through a sufficient arc to indicate on the dial 23 the weight of the container, both of the indicator hands being moved to the same point because of the fact that the clutch disk 38 fixed to the indicator shaft 22 is in engagement with the friction disk 37 secured to the adjustable hand 34, this being the normal position of the friction disks. The knob 64 is then grasped and pushed inwardly as above described to first lock the fixed indicator hand in this adjusted position and then to return the adjustable indicator hand 34 to zero position, this result being accomplished by the timed actuation of the clutch-throwing mechanism and the heart-cam actuating mechanism through the sliding movements of the rod 46 and rod 62 and the slidable cam 59, as above described. Thus, when the lever arm 45 is depressed by engagement with the rod 46, the bifurcated arms 42 are thrown into contact with the friction disk 38, locking said disk and the indicator shaft 22 and fixed indicator hand 27 connected therewith against rotative movement. Further rocking movement of the lever arm 45 then forces the disk 38 out of engagement with the companion friction disk 37 into substantially the position shown in Fig. 3, thus freeing the hub of the adjustable hand 34 from engagement with the fixed indicator hand 27 and shaft 22. The rocking of the lever arm 56 is then effected through the timed engagement with the slidable cam 59 depressing the rod 52 and the pivoted arm 50 to bring the roller 49 forcibly into engagement with the periphery of the heart-shaped cam 36 to thereby rotate the heart-shaped cam and the adjustable indicator hand 34 until said indicator hand again points to zero on the chart, which, as above described, is exactly located by the recess in the heart-shaped cam. The knob 64 is then grasped by the operator and pulled outwardly, returning the rods 46 and 62 and the slidable cam 59 to their original positions. In this return movement the rod 46 is first moved out of engagement with the lever arm 45, thus serving to allow the friction disk 38 to move into engagement with the companion disk 37 to frictionally secure the adjustable hand 34 to the indicator shaft before the heart-cam actuating means is released, the heart-cam actuating means serving meanwhile to hold the adjustable indicator hand in exact zero position. The roller 49 is then released from engagement with the heart-cam 36 through the continued movement of the rod 62 and slidable cam 59. The commodity to be weighed is then placed in the container, whereupon the hands 27 and 34 are again rotated simultaneously until the weight of the commodity is also offset, and the net weight of this commodity may be then read on the dial under the pointer of the adjustable indicator hand 34, which had previously been returned to zero position prior to the placing of the commodity on the scale, and the gross weight of the container and commodity may be read on the dial under the pointer of the fixed hand 27. The tare—*i. e.*, the weight of the container—is, of course shown between the fixed and adjustable hands.

The weighing of articles can readily be continued without removing the articles already on the platform, as for example, the adjustable hand may be again returned to zero on the dial in the aforesaid manner, and a second commodity may be placed on the scale platform and the two hands will again be simultaneously moved, the adjustable hand 34 indicating on the dial the weight of the last article placed upon the platform, and the fixed hand 27 indicating the total of all the weight on the scale platform. This operation can be repeatedly performed until the full capacity of the dial has been reached, and in case the scale is also equipped with tare and increased capacity beams, the weights thus totaled can be transferred to the tare and increased capacity beams, thereby returning both the fixed and adjustable hands into registration with the zero graduation on the dial, and separate weighings and additions could be continued to the full weighing capacity of the scale.

If it is desired to use the scale for ordinary weighing—*i. e.*, for indicating only one weight of the article being weighed—the index hands will be simultaneously moved to indicate the weight desired on the chart, and since the necessity for providing means for separately indicating tare weight is now obviated, the adjustable hand 34 continues to act in conjunction with the fixed hand 27 to indicate as one composite pointer the weight of any article or articles placed on the scale platform.

While it will be apparent that the illustrated embodiment of my invention herein disclosed is well calculated to adequately fulfil the objects primarily stated, it will be understood that the construction is susceptible to modification, variation and change without departing from the spirit and scope of the invention as set forth in the subjoined claims.

Having described my invention, I claim:

1. In a scale and in combination with the load-offsetting mechanism thereof, a pair of indicator hands, connections for driving said indicator hands from the load offsetting mechanism, and means for locking one of said indicator hands while permitting movement of the other, including co-acting clutch faces respectively carried by the indicator hands, a brake adapted to engage one of the clutch faces and disconnect it from the other, a heart-shaped cam carried by the freed indicator hand, and lever actuating means for engaging the heart cam to rotate the freed indicator hand relatively to the other hand, said lever actuating means including a slidable cam engaging the lever.

2. In a scale and in combination with the load-offsetting mechanism thereof, a pair of indicator hands, connections for driving said indicator hands from the load-offsetting mechanism, and means for locking one of said indicator hands while permitting movement of the other, including co-acting clutch faces respectively carried by the indicator hands, a brake adapted to engage one of the clutch faces and disconnect it from the other, a heart-shaped cam carried by the freed indicator hand, a roller adapted to contact the surface of the heart cam, and means for moving the roller to rotate the heart cam and freed indicator hand relatively to the other hand, including a lever and a slidable cam contacting the lever.

3. In a scale and in combination with the load-offsetting mechanism thereof, a pair of indicator hands, connections for driving said indicator hands from the load-offsetting mechanism, and means for locking one of said indicator hands while permitting movement of the other, including co-acting clutch faces respectively carried by the indicator hands, a brake adapted to engage one of the clutch faces and disconnect it from the other, a heart-shaped cam carried by the freed indicator hand, a roller adapted to contact the surface of the heart cam, a pivoted lever carrying the roller, and means for swinging the lever to bring the roller forcibly into engagement with the heart cam to move the cam and the freed indicator hand relatively to the other hand, including a lever and a slidable cam contacting the lever.

4. In a scale and in combination with the load-offsetting mechanism thereof, a pair of indicator hands, connections for driving said indicator hands from the load-offsetting mechanism, and means for locking one of said indicator hands while permitting movement of the other, including co-acting clutch faces respectively carried by the indicator hands, a brake adapted to engage one of the clutch faces and disconnect it from the other, a heart-shaped cam carried by the freed indicator hand, a roller adapted to contact the surface of the heart cam, a pivoted lever carrying the roller, a rod pivotally connected to the lever between its pivot and the roller, and means for rocking the lever to throw the roller forcibly into engagement with the heart cam to rotate said cam and the freed indicator hand relatively to the other hand, including a lever connected with the rod, and a slidable cam contacting the lever.

5. In a scale and in combination with the load-offsetting mechanism thereof, a pair of indicator hands, connections for driving said indicator hands from the load-offsetting mechanism, and means for locking one of said indicator hands while permitting movement of the other, including co-acting clutch faces respectively carried by the indicator hands, a brake adapted to engage one of the clutch faces and disconnect it from the other, a heart-shaped cam carried by the freed indicator hand, a roller adapted to contact the surface of the heart cam, a pivoted lever carrying the roller, and means for swinging the lever to bring the roller forcibly into engagement with the heart cam to move the cam and the freed indicator hand relatively to the other hand, including a bell-crank lever and a slidable cam contacting the lever.

6. In a scale and in combination with the load-offsetting mechanism thereof, indicating means including a shaft adapted to be rotated upon movement of the load-offsetting mechanism, an indicator hand fixed to said shaft, a second indicator hand arranged to be driven from the shaft, means for allowing independent movement of the second indicator hand relatively to the shaft, and means for locking the shaft in any adjusted position including a clutch disk carried by the shaft, a brake adapted to engage said clutch disk and secure it against rotation, lever mechanism for throwing said brake into and out of engagement with said disk, and a slidable cam contacting the lever mechanism and adapted to rock the same.

7. In a scale and in combination with the load-offsetting mechanism thereof, a graduated chart, a pair of indicator hands coöperating with the chart, connections therefrom to the load-offsetting mechanism whereby said hands are simultaneously actuated from the load-offsetting mechanism, means for locking one of said hands while permitting the independent movement of the other, and means for automatically returning the other indicator hand to the zero graduation of the chart, including a heart-shaped cam secured to the independently-movable indicator hand, a roller engaging the surface of the heart-shaped cam and adapted to seat in the recess thereof when said hand is in register with the zero graduation of the chart, and means for throwing the roller forcibly into engagement with the heart cam to rotate said cam and hand, including a lever mechanism connected with said roller, and a slidable cam contacting the lever mechanism.

8. In a scale and in combination with the load-offsetting mechanism thereof, a graduated chart, a pair of indicator hands coöperating with the chart, connections therefrom to the load-offsetting mechanism whereby said hands are simultaneously actuated from the load-offsetting mechanism, means for locking one of said hands while permitting the independent movement of the other, and means for automatically returning the other indicator hand to the zero graduation of the chart, including a heart-shaped cam secured to the independently-movable indicator hand, a roller engaging the surface of the heart-shaped cam and adapted to seat in the recess thereof when said hand is in register with the zero graduation of the chart, a pivoted lever carrying said roller, and means for rocking said lever to throw the roller forcibly into engagement with the heart cam to rotate said cam and hand, including a lever mechanism connected with said roller, and a slidable cam contacting the lever mechanism.

9. In a scale and in combination with the load-offsetting mechanism thereof, a graduated chart, a pair of indicator hands coöperating with the chart, connections therefrom to the load-offsetting mechanism whereby said hands are simultaneously actuated from the load-offsetting mechanism, means for locking one of said hands while permitting the independent movement of the other, and means for automatically returning the other indicator hand to the zero graduation of the chart, including a heart-shaped cam secured to the independently-movable indicator hand, a roller engaging the surface of the heart-shaped cam and adapted to seat in the recess thereof when said hand is in register with the zero graduation of the chart, a pivoted lever carrying said roller, a rod connected with said lever intermediate its pivot and the roller, a bell-crank lever connected with said rod, and actuating means including a slidable cam adapted to rock said bell-crank lever to throw the roller into engagement with the heart cam to rotate said cam and hand.

10. In a scale and in combination with the load-offsetting mechanism thereof, a pair of indicator hands adapted to be driven from the load-offsetting mechanism, mechanism for locking one of the indicator hands in any adjusted position, including a slidable cam, means for moving the other of said indicator hands relatively to the locked indicator hand including a slidable cam, the cams being so positioned and arranged that the locking mechanism is first actuated and then the mechanism for moving the free indicator hand.

11. In a scale and in combination with the load-offsetting mechanism thereof, a pair of indicator hands adapted to be driven from the load-offsetting mechanism, mechanism for locking one of the indicator hands in any adjusted position, including a slidable cam, means for moving the other of said indicator hands relatively to the locked indicator hand including a slidable cam, the cams being so positioned and arranged that the locking mechanism is first actuated and then the mechanism for moving the free indicator hand, and a single means for sliding both of said cams.

12. In a scale and in combination with the load-offsetting mechanism thereof, a pair of indicator hands adapted to be driven from the load-offsetting mechanism, mechanism for locking one of the indicator hands in any adjusted position, including a slidable cam, means for moving the other of said indicator hands relatively to the locked indicator hand including a slidable cam, a rod having one of the cams fixed thereon, the other of the slidable cams being loosely mounted on the rod, and a lost motion connection between the loosely mounted cam and the rod whereby the locking mechanism is first actuated upon the movement of the rod and then the mechanism for moving the free indicator hand.

13. In a scale and in combination with the load-offsetting mechanism thereof, indicating mechanism including a shaft adapted to be driven from the load-offsetting mechanism, an indicator hand fixed to said shaft, a second indicator hand loosely surrounding and arranged to be driven from the shaft, means for locking the shaft against rotation in any adjusted position and for rotating the second indicator hand relatively to the locked shaft, including a pair of bell-crank levers, a pair of slidable cams respectively engaging said bell-crank levers, and means for sliding said cams.

14. In a scale and in combination with the load-offsetting mechanism thereof, indicating mechanism including a shaft adapted to be driven from the load-offsetting mechanism, an indicator hand fixed to said shaft, a second indicator hand loosely surrounding and arranged to be driven from the shaft, means for locking the shaft against rotation in any adjusted position and for rotating the second indicator hand relatively to the locked shaft, including a pair of bell-crank levers, a pair of slidable cams respectively engaging said bell-crank levers, and a rod for sliding said cams, one of said cams being rigidly carried by the rod, and the other of said cams being loosely mounted upon the rod.

HALVOR O. HEM.

Witnesses:
F. A. Crowley,
Frances S. Doyle.

Copies of this patent may be obtained for five cents each, by addressing the "Commissioner of Patents, Washington, D. C."